(12) United States Patent
Wang (10) Patent No.: US 9,124,772 B2
(45) Date of Patent: Sep. 1, 2015

(54) SECURE TRANSMISSION METHOD AND APPARATUS FOR TRANSPORT STREAM

(76) Inventor: Xingjun Wang, Beijing (CN)

(*) Notice: Subject to any disclaimer, the term of this patent is extended or adjusted under 35 U.S.C. 154(b) by 14 days.

(21) Appl. No.: 14/110,436

(22) PCT Filed: Apr. 9, 2012

(86) PCT No.: PCT/CN2012/073658
§ 371 (c)(1),
(2), (4) Date: Nov. 29, 2013

(87) PCT Pub. No.: WO2012/136152
PCT Pub. Date: Oct. 11, 2012

(65) Prior Publication Data
US 2014/0093075 A1    Apr. 3, 2014

(30) Foreign Application Priority Data
Apr. 8, 2011  (CN) .......................... 2011 1 0088037

(51) Int. Cl.
| | |
|---|---|
| H04N 1/44 | (2006.01) |
| H04N 7/167 | (2011.01) |
| H04N 21/2389 | (2011.01) |
| H04N 21/4367 | (2011.01) |
| H04N 21/418 | (2011.01) |
| H04N 21/4623 | (2011.01) |
| H04N 21/426 | (2011.01) |
| H04N 21/4408 | (2011.01) |

(52) U.S. Cl.
CPC ....... *H04N 7/1675* (2013.01); *H04N 21/23895* (2013.01); *H04N 21/4181* (2013.01); *H04N 21/42623* (2013.01); *H04N 21/4367* (2013.01); *H04N 21/4408* (2013.01); *H04N 21/4623* (2013.01)

(58) Field of Classification Search
CPC ............ H04N 7/1675; H04N 21/4405; H04N 21/2347; H04N 21/4408; H04N 5/913
USPC ....................................................... 380/210
See application file for complete search history.

(56) References Cited

U.S. PATENT DOCUMENTS

| 2003/0110134 A1* | 6/2003 | Sasamoto et al. ............... 705/57 |
| 2006/0015750 A1* | 1/2006 | Ashley et al. ................. 713/193 |

FOREIGN PATENT DOCUMENTS

| CN | 1280742 A | 1/2001 |
| CN | 1381966 A | 11/2002 |
| CN | 101232336 A | 7/2008 |
| CN | 102164319 A | 8/2011 |

* cited by examiner

*Primary Examiner* — Kambiz Zand
*Assistant Examiner* — Stephen Sanders (57) ABSTRACT

Provided are a secure transmission method and apparatus for transport stream (TS). The method is applied to a receiving terminal of a digital television broadcasting system, comprising: after receiving a TS, a first device in the receiving terminal encrypts the received TS using a key already negotiated with a second device in the receiving terminal and utilizing a determined encryption algorithm, and sends the encrypted TS to the second device in the receiving terminal; after receiving the encrypted TS, the second device in the receiving terminal decrypts the received encrypted TS using the key and utilizing a decryption algorithm corresponding to the encryption algorithm. Using the present invention can protect the security of the TS transmission.

9 Claims, 9 Drawing Sheets

001
SECURE TRANSMISSION METHOD AND APPARATUS FOR TRANSPORT STREAM

FIELD OF THE INVENTION

The present invention relates to digital television technologies, in particular to a secure transmission method and apparatus for transport stream (TS).

BACKGROUND OF THE INVENTION

Moving Picture Experts Group (MPEG), a series of international standards for moving picture compression established by the moving picture experts group, has been widely applied in the fields like digital television, CD, DVD, video on demand, etc. It is defined in MPEG a TS that can be remotely transmitted in a noisy channel. The so-called TS is a single data stream, which is formed by one or a plurality of program elementary streams having a common time base or independent time bases and bears MPEG data streams to be transmitted.

At present, there are mainly two kinds of standard baseband transmission interfaces for TS transmission: one is Synchronous Parallel Interfaces (SPI) and the other is Synchronous Serial Interfaces (SSI). For convenience in the TS transmission, the existing MEPG decoding and encoding chips are all fitted with standard SPI and/or SSI.

To ensure normal profits of the cable television value-added services in a digital television application, provided in the prior art is Conditional Access (CA). This CA is a technical means, which can be implemented by a Conditional Access System (CAS) for the purpose that only authorized user terminals are allowed to watch a corresponding TS and unauthorized user terminals are unable to receive the TS. To achieve this purpose, CA encryption needs to be performed on the TS before the TS is sent to the user terminals, and when the CA-encrypted TS reaches the user terminals, CA descrambling is performed on the TS using a decryption key that is notified during authorization, after that, video decoding is performed and the resulting video is eventually offered to the users.

At present, the solution of CA descrambling is mainly a CA on-chip integration solution, i.e. CA descrambling and video decoding are set in the same main chip, this is one of the main forms of the current set-top boxes. In this solution, the scrambled TS is no longer output in a transparent form after entering the main chip, thus ensuring the security of the TS. This solution, however, is incompatible with different operators. For example, a main chip that can work normally in Beijing fails to do that in Shanghai owing to different operators.

To solve the problems above, further provided in the prior art are two solutions below:

One of these two solutions is a CA separation solution, which mainly comprises: an encrypted TS is transmitted, via an interface, to a dedicated CA card with the function of CA descrambling, and the CA card descrambles and then returns the received TS to a video decoding chip via a CA separation interface for video decoding, in order to eventually offer the video to users. This solution is the main form of Integrated Digital Televisions (IDTV). But in this solution, the TS transmitted in the CA separation interface is transparent and unprotected, in other words, the TS transmitted between the CA card and the video decoding chip is transparent and unprotected.

The other one is a CA board integration solution, which is mainly characterized in that a CA descrambling chip responsible for TS descrambling and a video decoding chip are arranged on the printed circuit board (PCB) of a user terminal, the CA descrambling chip performs CA descrambling on a received TS to obtain a transparent TS and sends the transparent TS to the video decoding chip for video decoding, in order to eventually offer the video to users. This solution is also the main form of Set-Top Boxes (STB) and Integrated Digital Televisions (IDTV). But in this solution, the TS transmitted between the CA descrambling chip and the video decoding chip is transparent and unprotected.

Typically, a TS transmitted between two devices can be copied if it is transparent, in this way, pirates are able to record programs corresponding to the TS by some technical means, and even to crack the TS scrambling key in real time by comparisons between transparent streams and encrypted streams. Therefore, it can be seen that the security of the TS transmission is severely influenced by the aforementioned two solutions.

SUMMARY OF THE INVENTION

Provided in the present invention are a secure transmission method and apparatus for transport stream (TS), in order to protect the security of the TS transmission.

A secure transmission method for transport stream (TS) is applied to a receiving terminal of a digital television broadcasting system, and comprises:

after receiving a TS, a first device in the receiving terminal encrypts the received TS using a key already negotiated with a second device in the receiving terminal and utilizing a determined encryption algorithm, and sends the encrypted TS to the second device in the receiving terminal; and after receiving the encrypted TS, the second device in the receiving terminal decrypts the received encrypted TS using the key and utilizing a decryption algorithm corresponding to the encryption algorithm.

A secure transmission apparatus for transport stream (TS) comprises: a first device and a second device, wherein, the first device is used for, after receiving a TS, encrypting the received TS using a key already negotiated with the second device and utilizing a determined encryption algorithm, and sending the encrypted TS to the second device; and the second device is used for, after receiving the encrypted TS sent by the first device, decrypting the received encrypted TS using the key and utilizing a decryption algorithm corresponding to the encryption algorithm.

It is thus clear from the aforementioned technical solution that, in the present invention, after receiving a TS, the first device encrypts the received TS using a key already negotiated with the second device and utilizing a determined encryption algorithm, and sends the encrypted TS to the second device; and after receiving the encrypted TS, the second device decrypts the received encrypted TS using the key and utilizing a decryption algorithm corresponding to the encryption algorithm, afterwards, corresponding operations can be performed on the decrypted TS, for example, video decoding is performed on the decrypted TS to provide a decoded video, that is to say, the TS, after being received at the receiving terminal, is further encrypted in the present invention, which accordingly ensures that the TS can safely reach the chip for video decoding to prevent transmission of the TS transparent stream between the devices.

DETAILED DESCRIPTION OF THE EMBODIMENTS

For better clarity of the objectives, technical solutions and advantages of the present invention, the present invention will be described below in details in conjunction with the accompanying drawings and the specific embodiments.

Figure 1:
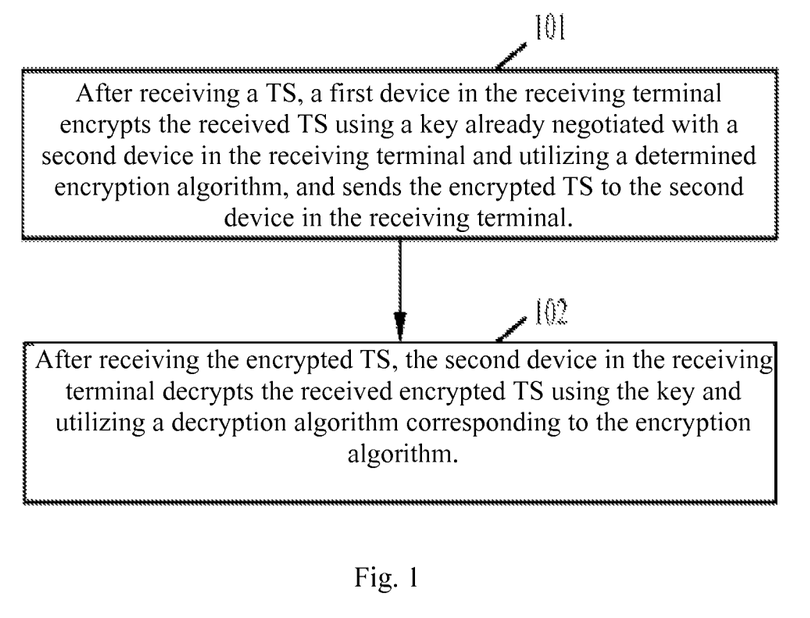
FIG. 1 is a basic flow diagram provided in the present invention.

The method provided in the present invention is mainly applied to a receiving terminal of a digital television broadcasting system, and as shown in FIG. 1, the method mainly comprises:

Step 101, after receiving a TS, a first device in the receiving terminal encrypts the received TS using a key already negotiated with a second device in the receiving terminal and utilizing a determined encryption algorithm, and sends the encrypted TS to the second device in the receiving terminal.

Step 102, after receiving the encrypted TS, the second device in the receiving terminal decrypts the received encrypted TS using the key and utilizing a decryption algorithm corresponding to the encryption algorithm.

As an implementation form of the embodiments of the present invention, the encryption algorithm in step 101 and the description algorithm in step 102 are derived from agreement in advance or configuration in other ways, and are not limited in a specific way in the embodiments of the present invention.

The key in the step 101 and the step 102 may be determined by the first device and the second device using a key negotiation mechanism. Description is now made below with reference to two specific embodiments.

Embodiment 1

This embodiment 1 is an embodiment in which the method shown in FIG. 1 is applied to a CA board integration solution scene, on this basis, the first device in FIG. 1 may be a chip or function unit with the function of TS connection protection, which is connected with a TS output port of a Digital Video Broadcasting-Cable TUNNER (DVBC TUNNER), and correspondingly, the second device in FIG. 1 may be an MPEG decoding chip. Detailed description is now made below with reference to FIG. 2.

Figure 2:
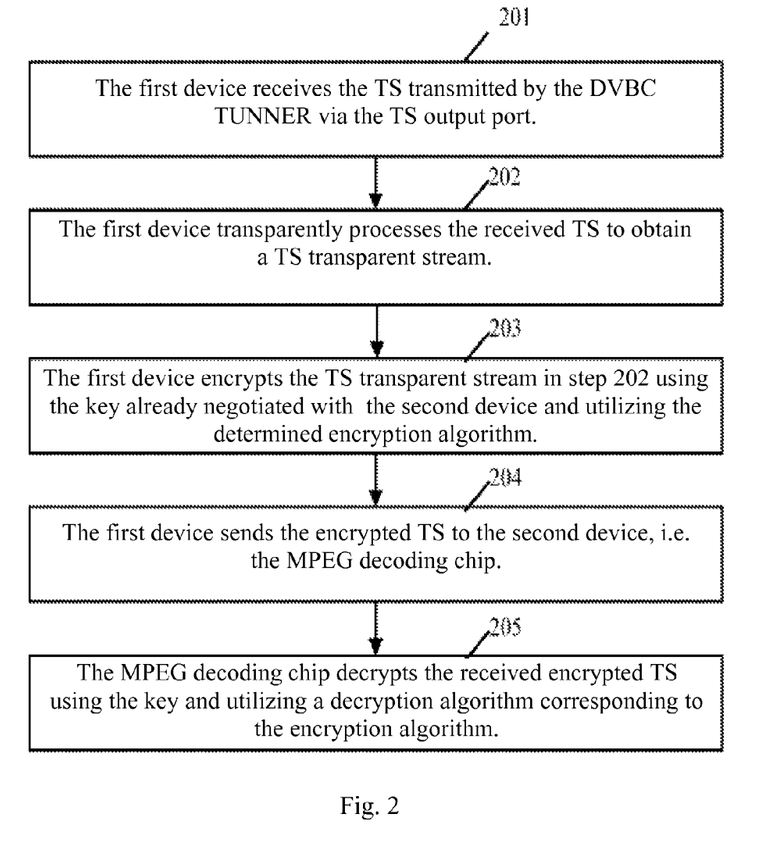
FIG. 2 is an implementation flow diagram of embodiment 1 provided in the present invention.

Referring to FIG. 2, it is an implementation flowchart of embodiment 1 provided in the present invention. As shown in FIG. 2, the flow may comprise:

Step 201, the first device receives the TS transmitted by the DVBC TUNNER via the TS output port.

Step 202, the first device transparently processes the received TS to obtain a TS transparent stream.

In view of the security of the TS transmission, the TS sent to the first device by the DVBC TUNNER is typically encrypted. On this basis, the transparent processing on the TS in step 202 is exactly decryption of the TS. Preferably, if the TS received by the first device is multiplexing of a plurality of video streams, the transparent processing on the TS in step 202 comprises: demultiplexing the received TS at first and then decrypting the demultiplexed TS.

Step 203, the first device encrypts the TS transparent stream in step 202 using the key already negotiated with the second device and utilizing the determined encryption algorithm.

The key in step 203 may be written into the first device via the CPU bus by the second device, i.e. the MPEG decoding chip, before step 203 is executed. The key may be randomly generated by a CPU inside the MPEG decoding chip.

Step 204, the first device sends the encrypted TS to the second device, i.e. the MPEG decoding chip.

Preferably, in this embodiment, a TS output interface may be arranged between the first device and the MPEG decoding chip, that is, the first device is connected with the MPEG decoding chip via the TS output interface arranged, on this basis, in step 204, the first device may send the encrypted TS to the MPEG decoding chip via the TS output interface arranged.

Step 205, the MPEG decoding chip decrypts the received encrypted TS using the key and utilizing a decryption algorithm corresponding to the encryption algorithm.

The key in step 203 may be written into the first device via the CPU bus by the second device itself, i.e. the MPEG decoding chip, thus, when step 205 is executed, it is quite easy for the MPEG decoding chip to determine the key used by the decryption algorithm corresponding to the encryption algorithm, and further, description is performed according to the determined key and the decryption algorithm corresponding to the encryption algorithm.

Then, the MPEG decoding chip may perform corresponding operations on the decrypted TS, for example, video decoding is performed on the decrypted TS to provide a decoded video, and this is not limited in a specific way in the embodiments of the present invention.

Thus, the flow of this embodiment 1 is implemented through steps 201 to 205 discussed above.

Embodiment 2

This embodiment 2 is an embodiment in which the method shown in FIG. 1 is applied to a CA board integration solution scene, on this basis, the first device in FIG. 1 may be a chip or function unit with the function of TS connection protection, specifically a CA separation card side, and correspondingly, the second device in FIG. 1 may comprise a CA separation host side and an MPEG decoding chip, wherein the CA separation host side is connected with a TS output port of a DVBC TUNNER, and connected with the CA separation card side via a CA separation interface. Detailed description is now made below with reference to FIG. 3.

Figure 3:
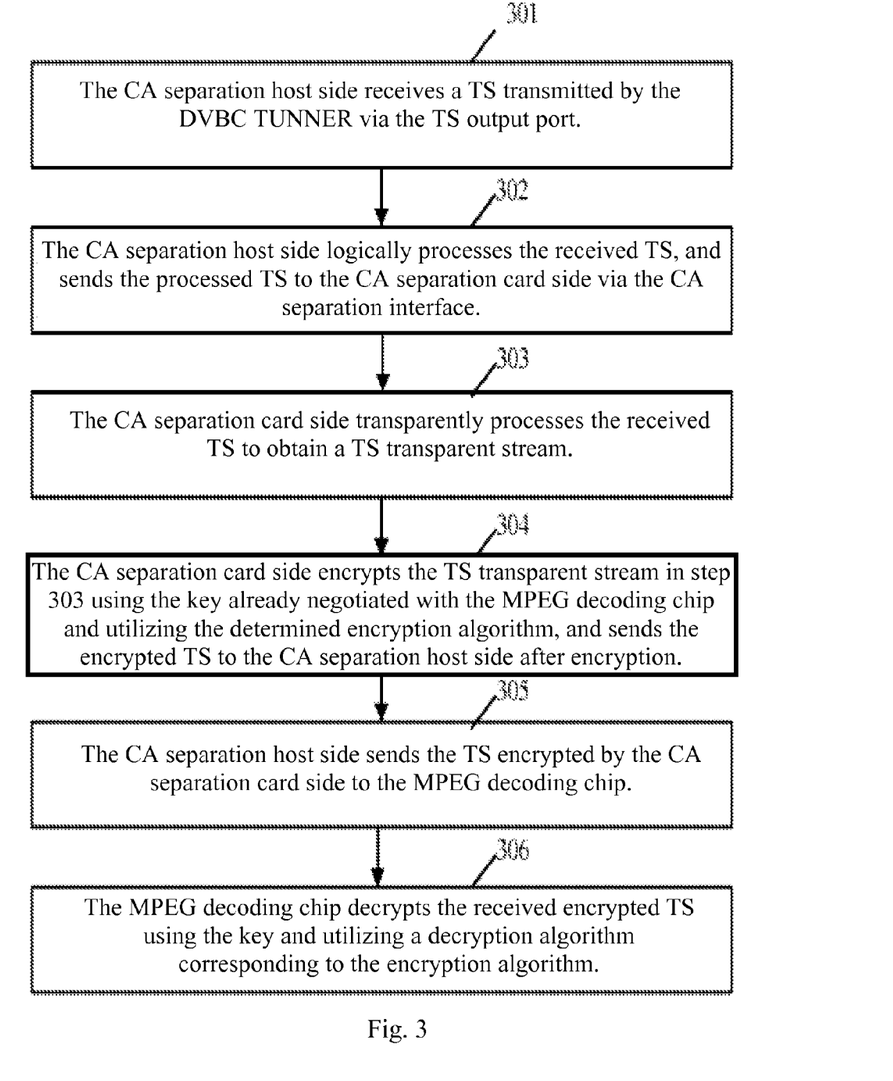
FIG. 3 is an implementation flow diagram of embodiment 2 provided in the present invention.

Referring to FIG. 3, it is an implementation flowchart of embodiment 2 provided in the present invention. As shown in FIG. 3, the flow may comprise:

Step 301, the CA separation host side receives a TS transmitted by the DVBC TUNNER via the TS output port.

Step 302, the CA separation host side logically processes the received TS, and sends the processed TS to the CA separation card side via the CA separation interface.

The logic processing in step 302 may comprise demultiplexing and the like during specific implementation.

Step 303, the CA separation card side transparently processes the received TS to obtain a TS transparent stream.

In view of the security of the TS transmission, the TS sent to the CA separation host side by the DVBC TUNNER is typically encrypted. On this basis, the transparent processing in step 303 is substantially decryption.

Step 304, the CA separation card side encrypts the TS transparent stream in step 303 using the key already negotiated with the MPEG decoding chip and utilizing the determined encryption algorithm, and sends the encrypted TS to the CA separation host side after encryption.

The key in step 304 may be written into the CA separation host side via the CPU bus by the MPEG decoding chip in the second device at first and then sent to the CA separation card side by the CA separation host side via the CA separation interface, and may be randomly generated by a CPU inside the MPEG decoding chip.

Step 305, the CA separation host side sends the TS encrypted by the CA separation card side to the MPEG decoding chip.

Preferably, in this embodiment, a TS output interface may be arranged between the CA separation host side and the MPEG decoding chip, that is, the CA separation host side is connected with the MPEG decoding chip via the TS output interface arranged, and on this basis, in step 305, the CA separation host side may send the encrypted TS to the MPEG decoding chip via the TS output interface arranged.

Step 306 is similar to step 205 and accordingly not repeated herein.

Up to this point, the flow of this embodiment 2 is implemented through steps 301 to 306 discussed above.

It shall be noted that, both the encryption algorithm and the decryption algorithm in the aforementioned embodiments 1 and 2, while specific implementation, may adopt Digital Video Broadcasting (DVB) Common Scrambling Algorithm (CSA), Data Encryption Standard (DES), Triple Data Encryption Standard (3-DES) or Advanced Encryption Standard (AES), etc., and are not limited in a specific way in the embodiments of the present invention.

The method provided in the embodiments of the present invention is described above, and the apparatus provided in the embodiments of the present invention will be described below.

Figure 4:
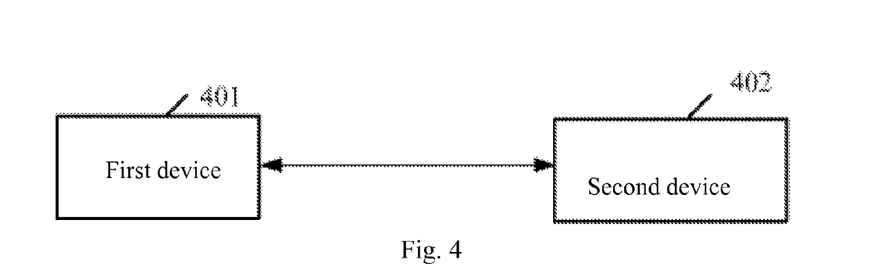
FIG. 4 is a basic structural diagram of the apparatus provided in the embodiments of the present invention.

Referring to FIG. 4, it is a basic structural diagram of the apparatus provided in the embodiments of the present invention. The apparatus is corresponding to the method shown in FIG. 1, and comprises, as shown in FIG. 4, a first device 401 and a second device 402,
    wherein the first device 401 is used for, after receiving a TS, encrypting the received TS using a key already negotiated with the second device 402 and utilizing a determined encryption algorithm, and sending the encrypted TS to the second device; and
    the second device 402 is used for, after receiving the encrypted TS sent by the first device 401, decrypting the received encrypted TS using the key and utilizing a decryption algorithm corresponding to the encryption algorithm.

In this embodiment, the key may be determined by the first device 401 and the second device 402 using a key negotiation mechanism.

Up to this point, the apparatus shown in FIG. 4 is completely described.

For better clarity of the apparatus provided in the present invention, the apparatus will be described below in details.

Figure 5:
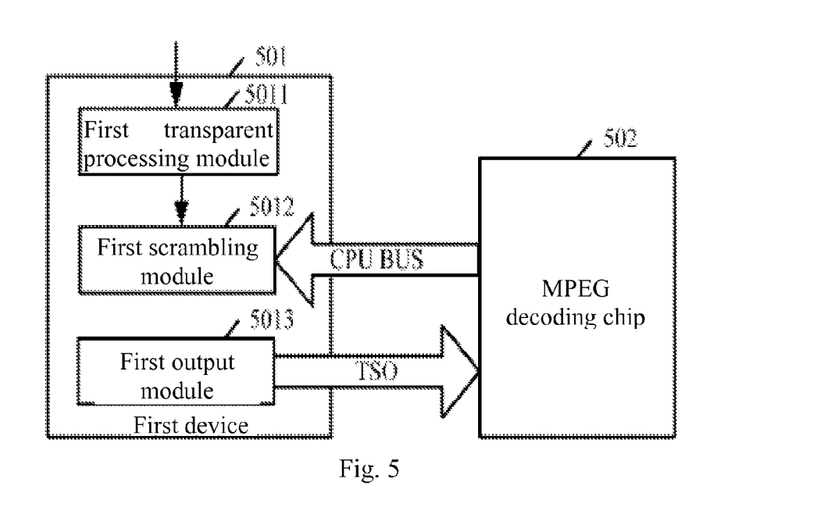
FIG. 5 is a detailed structural diagram of a first apparatus provided in the present invention.

Referring to FIG. 5, it is a detailed structural diagram of the first apparatus provided in the present invention. The apparatus is applied to a CA board integration solution scene, corresponding to the method shown in FIG. 2, and while specific implementation, may comprise a first device 501 and a second device 502.

Preferably in this embodiment, the first device 501 may comprise a first transparent processing module 5011, a first scrambling module 5012 and a first output module 5013, In this case, the first transparent processing module 5011 is used for transparently processing the received TS to obtain a TS transparent stream; and herein, the first transparent processing module 5011 may receive a TS sent externally, e.g. by a DVBC TUNNER.

The first scrambling module 5012 is connected with the second device 502, and is used for encrypting the TS transparent stream using the key already negotiated with the second device 502 and utilizing the determined encryption algorithm.

The first output module 5013 is used for outputting the encrypted TS transparent stream to the second device 502.

The second device 502 is used for decrypting the received encrypted TS using the key and utilizing a decryption algorithm corresponding to the encryption algorithm. Preferably, the second device 502 may be an MPEG decoding chip, and the apparatus shown in FIG. 5 is illustrated by an example of taking the second device 502 as the MPEG decoding chip. On this basis, the MPEG decoding chip may be connected with the first scrambling module 5012 via a CPU bus, as specifically shown in FIG. 5, so that the key used by the encryption algorithm is written into the first scrambling module 5012 via the CPU bus.

The apparatus shown in FIG. 5 is described above.

Figure 6:
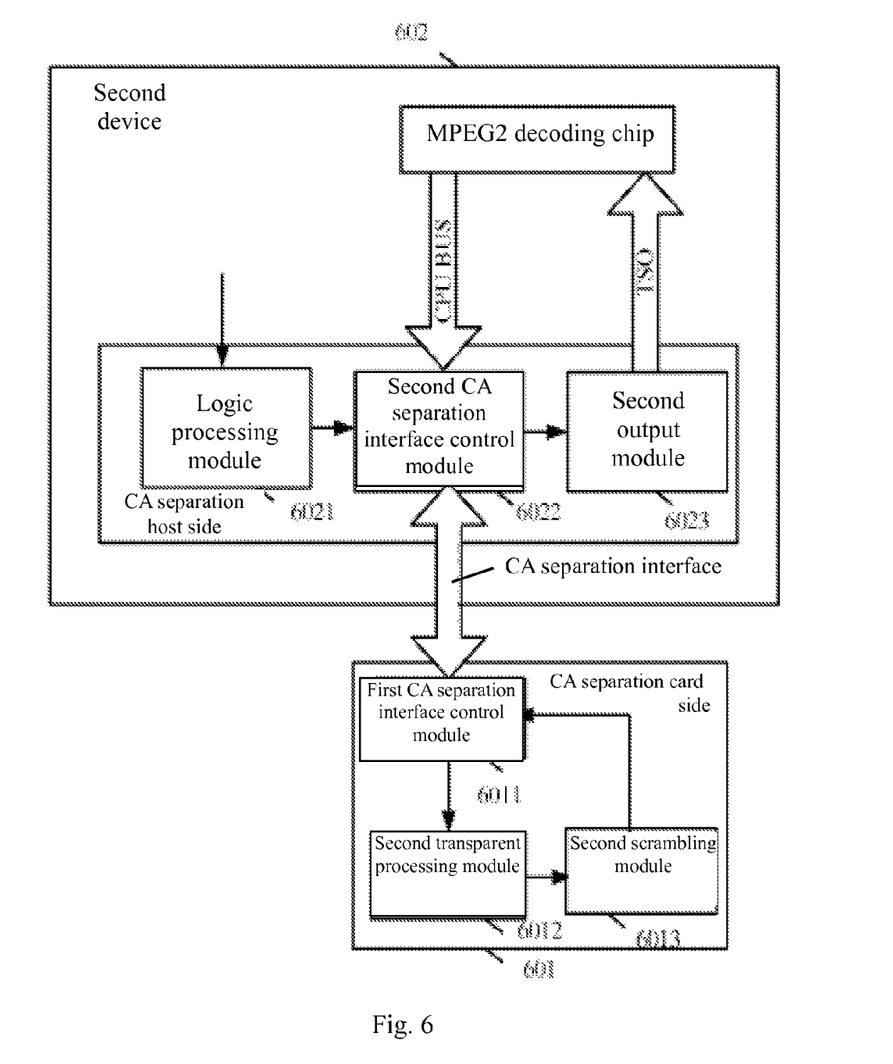
FIG. 6 is a detailed structural diagram of a second apparatus provided in the present invention.

Referring to FIG. 6, it is a detailed structural diagram of the second apparatus provided in the present invention. The apparatus is applied to a CA separation solution scene, corresponding to the method shown in FIG. 3, and while specific implementation, may comprise a first device 601 and a second device 602.

Preferably in this embodiment, the first device 601 may be a CA separation card side; and correspondingly, the second device 602 may comprise a CA separation host side and an MPEG decoding chip, wherein the CA separation host side is connected with the CA separation card side via a CA separation interface.

Preferably in this embodiment, the CA separation host side may be connected with an external DVBC TUNNER and used for sending the TS sent by the DVBC TUNNER.

Preferably in this embodiment, as shown in FIG. 6, the CA separation card side may comprise a first CA separation interface control module 6011 connected with a second CA separation interface control module 6022 via a CA separation interface, a second transparent processing module 6012 and a second scrambling module 6013.

The CA separation host side may comprise a logic processing module 6021, the second CA separation interface control module 6022 and a second output module 6023,
    wherein the logic processing module 6021 is used for logically processing the received TS, and sending the processed TS to the second CA separation interface control module 6022;
    the second CA separation interface control module 6022 is used for sending the TS from the logic processing module 6021 to the first CA separation interface control module 6011 via the CA separation interface, and used for receiving the TS sent by the first CA separation interface control module 6011;
    the second output module 6023 is used for outputting to the MPEG decoding chip the encrypted TS received by the second CA separation interface control module 6022 and sent by the first CA separation interface control module 6011;

the first CA separation interface control module 6011 is used for transmitting to the second transparent processing module 6012 the received TS sent by the second CA separation interface control module 6022;

the second transparent processing module 6012 is used for transparently processing the received TS to obtain a TS transparent stream;

the second scrambling module 6013 is used for encrypting the TS transparent stream using a key and utilizing a determined encryption algorithm, the key is written into the second CA separation interface control module 6022 by the MPEG decoding chip at first, then sent to the first CA separation interface control module 6011 by the second CA separation interface control module 6022 via the CA separation interface, and finally sent to the second scrambling module 6013 by the first CA separation interface control module 6011. Preferably, the MPEG decoding chip may write the key into the second CA separation interface control module 6022 via a CPU bus, as specifically shown in FIG. 6.

The MPEG decoding chip receives the encrypted TS output by the second output module 6023, and decrypts the received encrypted TS using the key used by the second scrambling module 6013 and utilizing the decryption algorithm corresponding to the encryption algorithm.

The apparatus shown in FIG. 6 is described above.

It shall be noted that, the interface for TS transmission, the data interfaces for the CA separation host and card sides, and the TS interfaces for the MPEG decoding chip and the CA separation host side, all involved in this embodiment, are under the protection of the TS connection protection technology proposed in the present invention.

Embodiment 3

Figure 7:
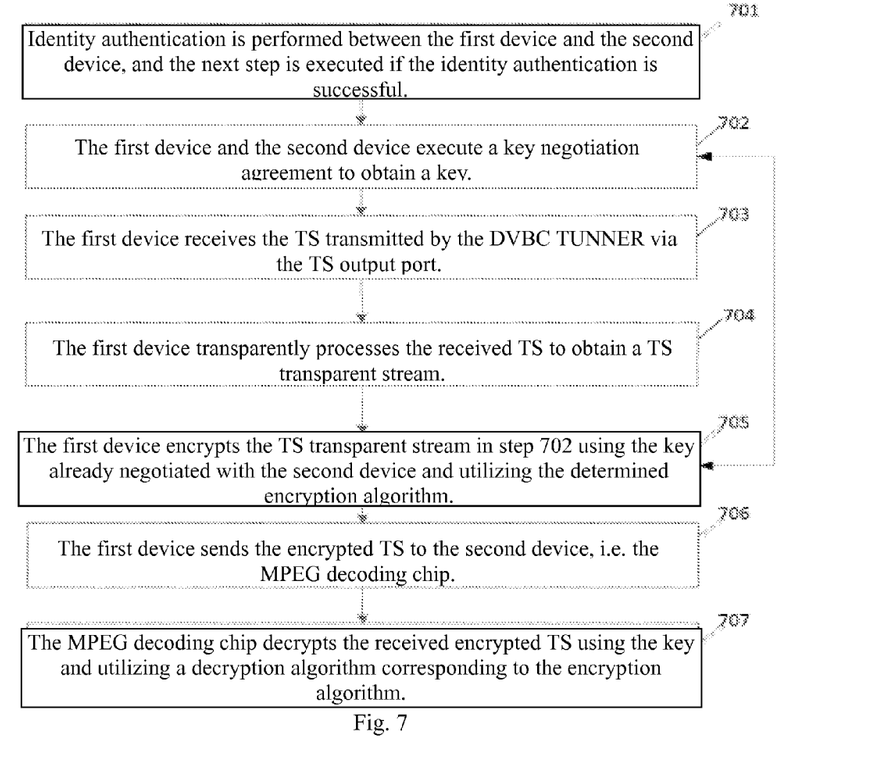
FIG. 7 is an implementation flow diagram of embodiment 3 provided in the present invention.
Figure 8:
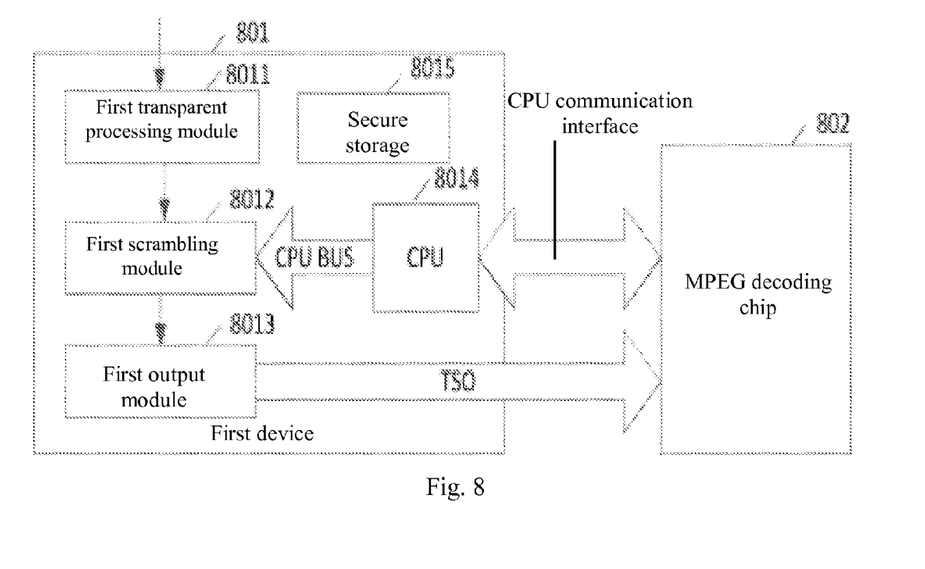
FIG. 8 is a basic structural diagram of embodiment 3 provided in the present invention.

This embodiment 3 is another embodiment in which the method shown in FIG. 1 is applied to a CA board integration solution scene, on this basis, the first device may be a chip or function unit with the function of TS connection protection, which is connected with a TS output port of a Digital Video Broadcasting-Cable TUNNER (DVBC TUNNER) and has a CPU module and a secure storage module, as shown in FIG. 8. Correspondingly, the second device in FIG. 1 may be an MPEG decoding chip. Detailed description is now made below with reference to FIG. 7.

Referring to FIG. 7, it is an implementation flowchart of embodiment 3 provided in the present invention. As shown in FIG. 7, the flow may comprise:

Step 701, the first device performs identity authentication on the second device, and step 702 is executed if the second device passes this identity authentication;

Step 702, the first device and the second device execute a key negotiation agreement to obtain an encryption/decryption key for TS transmission between the two devices;

Steps 703 to 707 are similar to steps 201 to 205 and accordingly not repeated herein.

The difference is that, the key may be changed in real time in the process of TS transmission, that is to say, when step 705 is executed, the key during transmission can be changed through returning to step 702. The real-time change of the key may be altered by an agreement protocol between the first device and the second device, for example, a private data TS packet identifying key change is inserted into the TS, or, encryption of a TS packet is interrupted within a period of time to change encryption identification bits corresponding to the TS packet, so the encryption key is updated as a new key when encryption is performed once again. Also, there may be a variety of flexible methods for real-time key update, which are not limited in a specific way in the present invention. When identity authentication is performed, as shown in FIG. 8, the certificate or key of the second device 802 should be stored in a secure storage area 8015 of the first device 801, and the second device 802 also pre-stores its own certificate or key.

Figure 9:
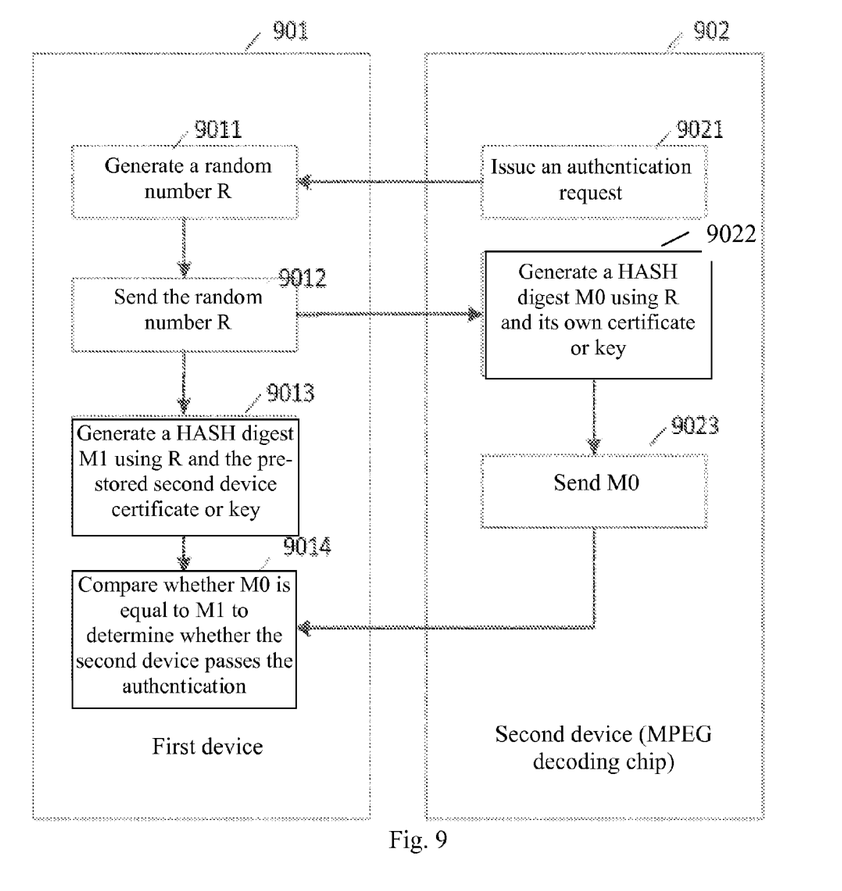
FIG. 9 is an identity authentication flow diagram of embodiment 3 provided in the present invention.

The identity authentication in step 701 may be performed using a challenge-response mechanism, as shown in FIG. 9.

Step 9021, a second device 902 issues an identity authentication request;

Step 9011, a first device 901 receives the identity authentication request and then generates a random number R;

Step 9012, the first device 901 sends R to the second device 902;

Step 9013, the first device 901 generates a digest M1 from HASH function using the R and the pre-stored second certificate or key;

Step 9022, the second device 902 generates a digest M0 from HASH function using R and its own certificate or key;

Step 9023, the second device 902 sends the computation result M0 to the first device 901;

Step 9014, comparison between the M0 and the M1 is performed by the first device 901, and the identity authentication is successful if they are equal to each other.

This challenge-response identity authentication is only an identity authentication mechanism adopted in the embodiment, there may be a variety of flexible methods for identity authentication, and it is not limited in a specific way in the present invention.

Figure 10:
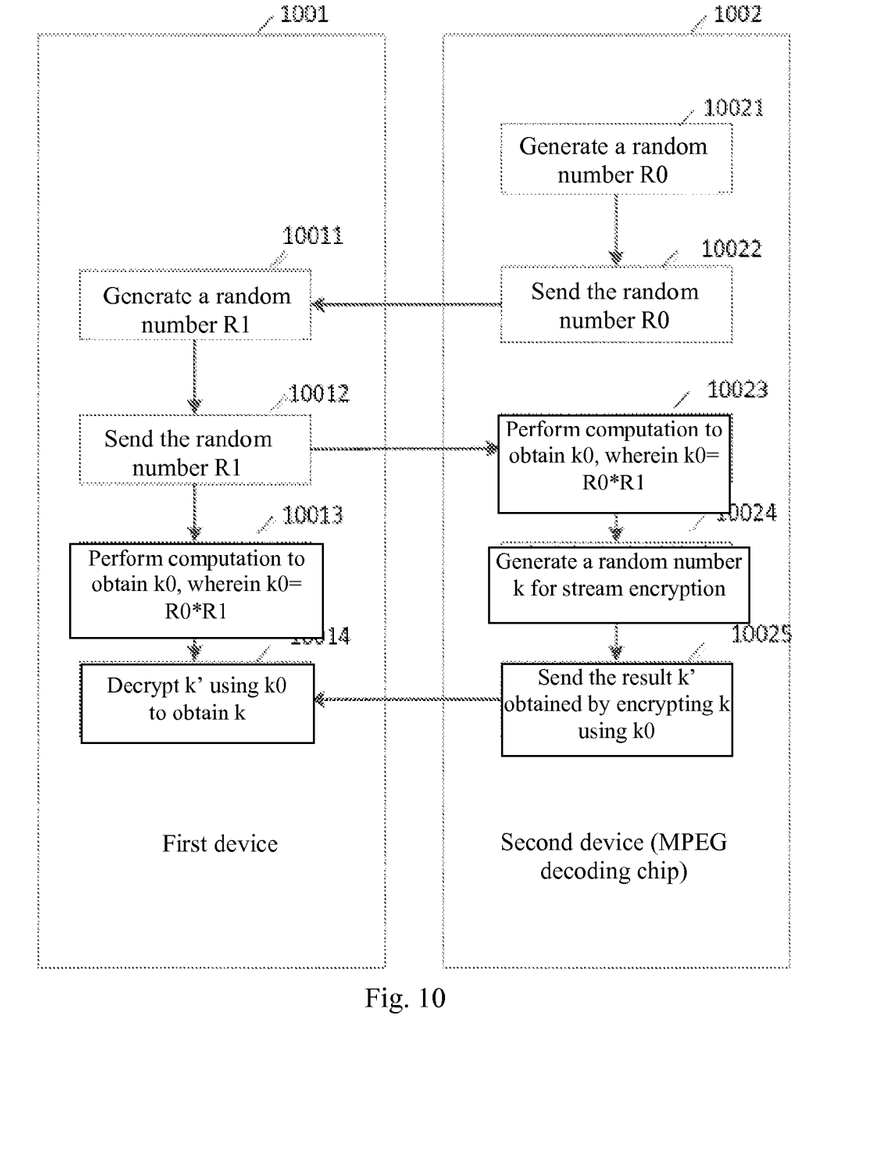
FIG. 10 is a key negotiation flow diagram of embodiment 3 provided in the present invention.

The key negotiation in step 702 may be performed using a key negotiation mechanism in FIG. 10, with the specific steps described below.

Step 10021, a second device 1002 generates a 64-bit nonzero random number R0;

Step 10022, the second device 1002 sends R0 to a first device 1001;

Step 10011, the first device 1001 then generates a 64-bit nonzero random number R1;

Step 10012, the first device 1001 sends R1 to the second device;

Step 10013, the first device 1001 performs computation to obtain a 128-bit key k0, wherein k0=R0*R1;

Step 10023, the second device 1002 also performs computation to obtain a 128-bit key k0, wherein k0=R0*R1;

Step 10024, the second device generates a 64-bit key k for stream encryption and decryption;

Step 10025, the second device 1002 encrypts k using k0 as the key and using an AES 128-bit algorithm to obtain a 128-bit k', and sends k' to the first device 1001;

Step 10014, the first device 1001 decrypts the k' to obtain the key k for stream encryption and decryption.

This key negotiation mechanism is only a mechanism adopted in the embodiment, there may be a variety of flexible methods for key negotiation, and key negotiation is not limited in a specific way in the present invention.

It is thus clear from the aforementioned technical solution that, in the present invention, after receiving a TS, the first device encrypts the received TS using a key already negotiated with the second device and utilizing a determined encryption algorithm, and sends the encrypted TS to the second device; and after receiving the encrypted TS, the second device decrypts the received encrypted TS using the key and utilizing a decryption algorithm corresponding to the encryption algorithm. That is to say, the TS, after being received at the receiving terminal, is further encrypted in the present invention, which accordingly ensures that the TS can safely reach the video decoding chip to prevent transmission of the TS transparent stream between the devices. Simultaneously, identity authentication on the second device may be performed by the first device, which ensures the validity of the device connected and further improves the security in transmission.

Described above are the preferred embodiments of the present invention only, which are not intended to limit the present invention, and any modifications, equivalent substitutions and improvements made without departing from the spirit and principle of the present invention shall be incorporated within the scope of the present invention.

What is claimed is:

1. A secure transmission method for transport stream (TS), which is applied to a receiving terminal of a digital television broadcasting system, characterized in that in a CA board integration solution scene, the method comprises:

after receiving a TS, a first device in the receiving terminal, a chip or function unit with the function of TS connection protection encrypts the received TS using a key already negotiated with a second device, a Moving Picture Experts Group (MPEG) decoding chip in the receiving terminal and utilizing a determined encryption algorithm, and sends the encrypted TS to the second device in the receiving terminal; and after receiving the encrypted TS, the second device in the receiving terminal decrypts the received encrypted TS using the key and utilizing a decryption algorithm corresponding to the encryption algorithm.

2. The method according to claim 1, characterized in that the method is applied to a CA board integration solution scene, and the step that the first device encrypts the received TS using the key already negotiated with the second device and utilizing the determined encryption algorithm comprises:

the first device transparently processes the received TS to obtain a TS transparent stream;

the first device encrypts the TS transparent stream using the key already negotiated with the second device and utilizing the determined encryption algorithm.

3. The method according to claim 2, characterized in that the second device is a Moving Picture Experts Group (MPEG) decoding chip; and the key already negotiated with the second device is a key written into the first device by the MPEG decoding chip.

4. A secure transmission method for transport stream (TS), applied to a receiving terminal of a digital television broadcasting system, characterized in that the method is applied to a CA separation solution scene, and comprises that:

the first device is a CA separation card side;

the step that the first device encrypts the received TS using the key already negotiated with the second device and utilizing the determined encryption algorithm comprises:

the CA separation card side transparently processes the received TS to obtain a TS transparent stream;

the CA separation card side encrypts the TS transparent stream using the key already negotiated with the second device and utilizing the determined encryption algorithm;

the second device comprises a CA separation host side and an MPEG decoding chip; the CA separation host side is connected with the CA separation card side via a CA separation interface;

the TS received by the CA separation card side is a TS transmitted by the CA separation host side via the CA separation interface;

the CA separation card side sends the encrypted TS to the CA separation host side via the CA separation interface, and the CA separation host side outputs the encrypted TS to the decoding chip;

the MPEG decoding chip decrypts the received encrypted TS using the key and utilizing a decryption algorithm corresponding to the encryption algorithm.

5. The method according to claim 4, characterized in that negotiation of the key between the first device and the second device comprises:

the MPEG decoding chip writes the key into the CA separation host side, and then, the CA separation host side sends the key to the CA separation card side via the CA separation interface.

6. The method according to claim 4, characterized in that both the encryption algorithm and the decryption algorithm adopt Digital Video Broadcasting (DVB) Common Scrambling Algorithm (CSA), Data Encryption Standard (DES), Triple Data Encryption Standard (3-DES) or Advanced Encryption Standard (AES).

7. The apparatus according to claim 4, characterized in that the second device comprises a CA separation host side and an MPEG decoding chip; the CA separation host side is connected with the CA separation card side via a CA separation interface;

the CA separation host side comprises:

a logic processing module, for logically processing the received TS, and sending the processed TS to a second CA separation interface control module;

a second CA separation interface control module, connected with the first CA separation interface control module via the CA separation interface, used for sending the TS from the logic processing module to the first CA separation interface control module via the CA separation interface so that the first CA separation interface control module sends the received TS to the second transparent processing module for transparent processing, and used for receiving the TS sent by the first CA separation interface control module; and a second output module, for outputting to the MPEG decoding chip the encrypted TS received by the second CA separation interface control module and sent by the first CA separation interface control module;

the MPEG decoding chip receives the encrypted TS output by the second output module, and decrypts the received encrypted TS using the key used by the second scrambling module and utilizing the decryption algorithm corresponding to the encryption algorithm, wherein the key used by the second scrambling module is written into the second CA separation interface control module by the MPEG decoding chip at first, then sent to the first CA separation interface control module by the second CA separation interface control module via the CA separation interface, and finally sent to the second scrambling module by the first CA separation interface control module.

8. The method according to claim 1, characterized in that the key can be generated by a second device, i.e. a Moving Picture Experts Group (MPEG) decoding chip, vice versa.

9. The method according to claim 1, characterized in that the encryption algorithm and the decryption algorithm adopt Digital Video Broadcasting (DVB) Common Scrambling Algorithm (CSA), Data Encryption Standard (DES), Triple Data Encryption Standard (3-DES) or Advanced Encryption Standard (AES).

* * * * *